United States Patent Office 3,151,456
Patented Oct. 6, 1964

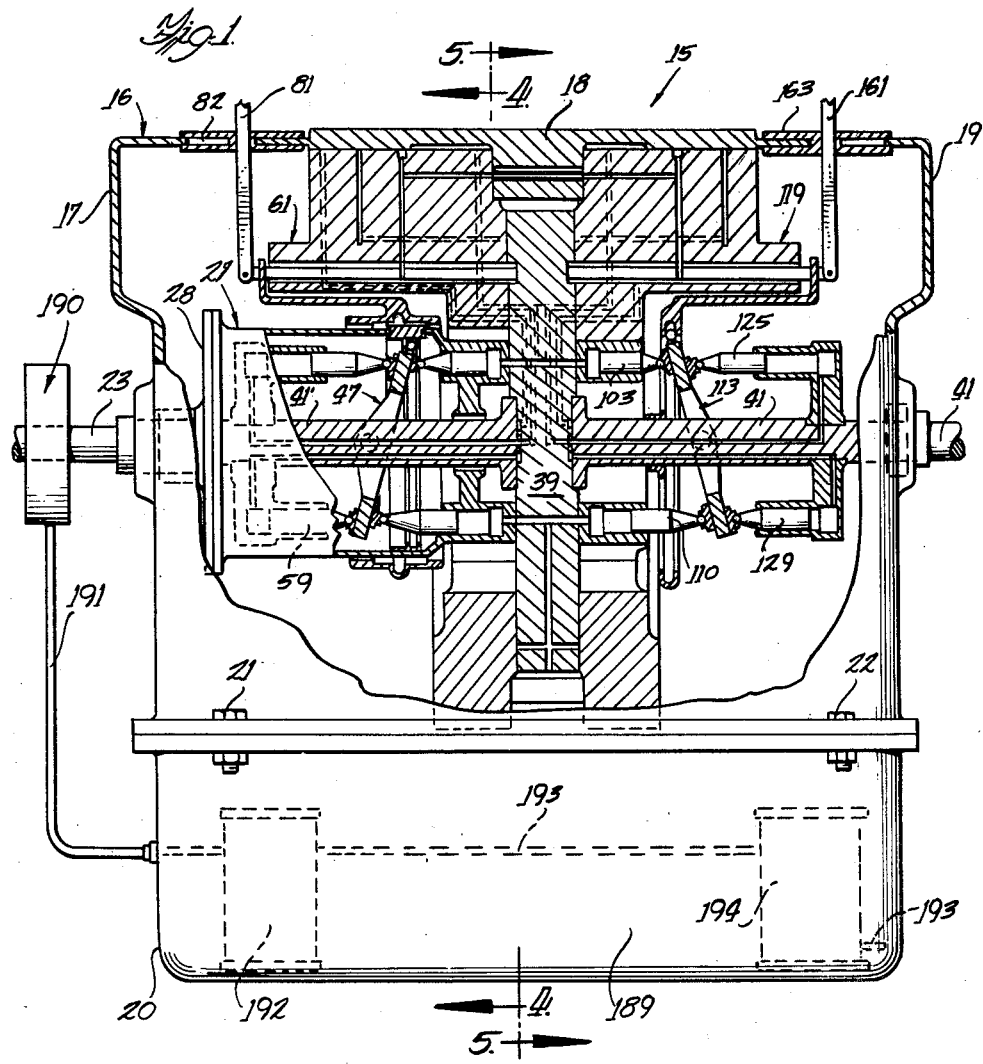

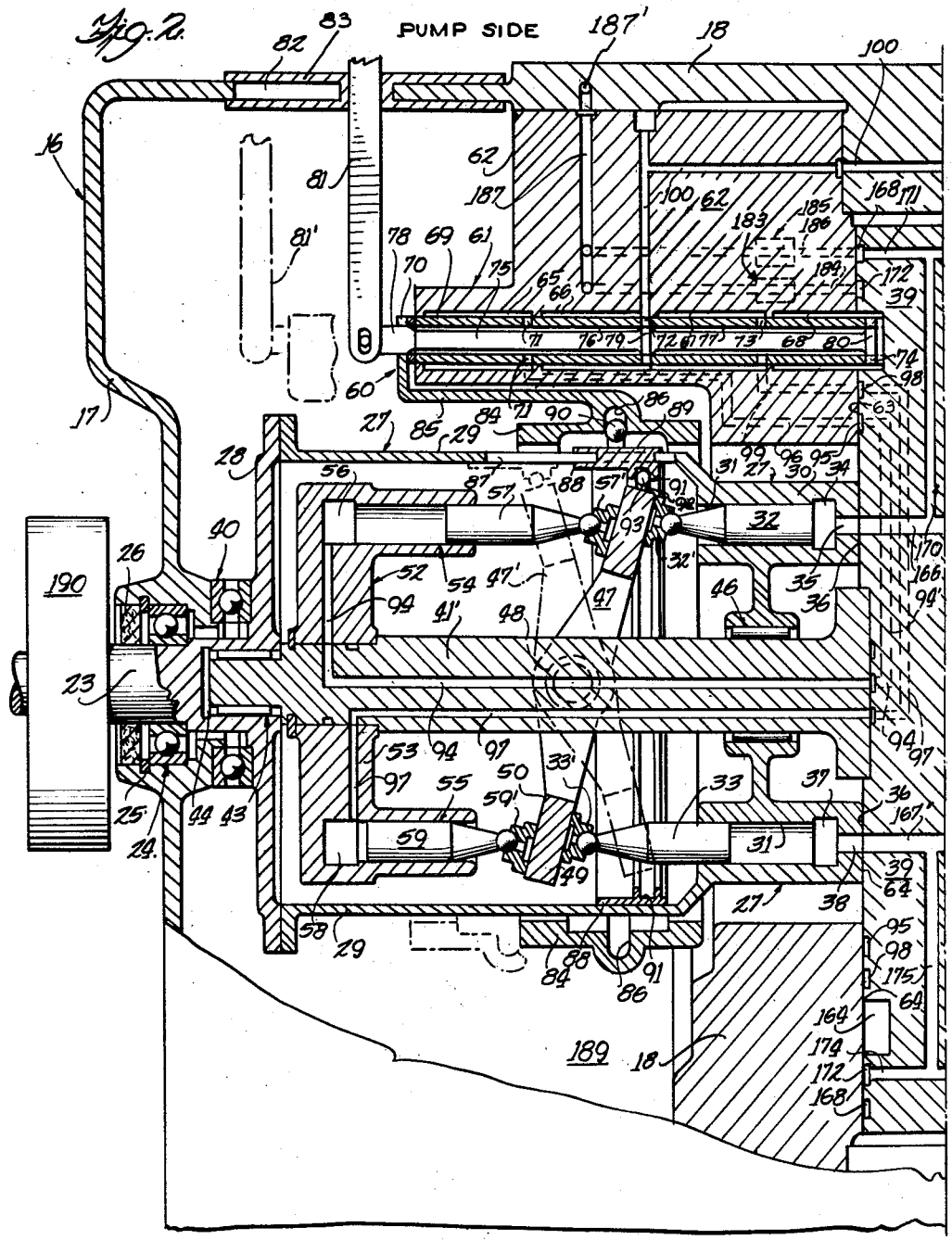

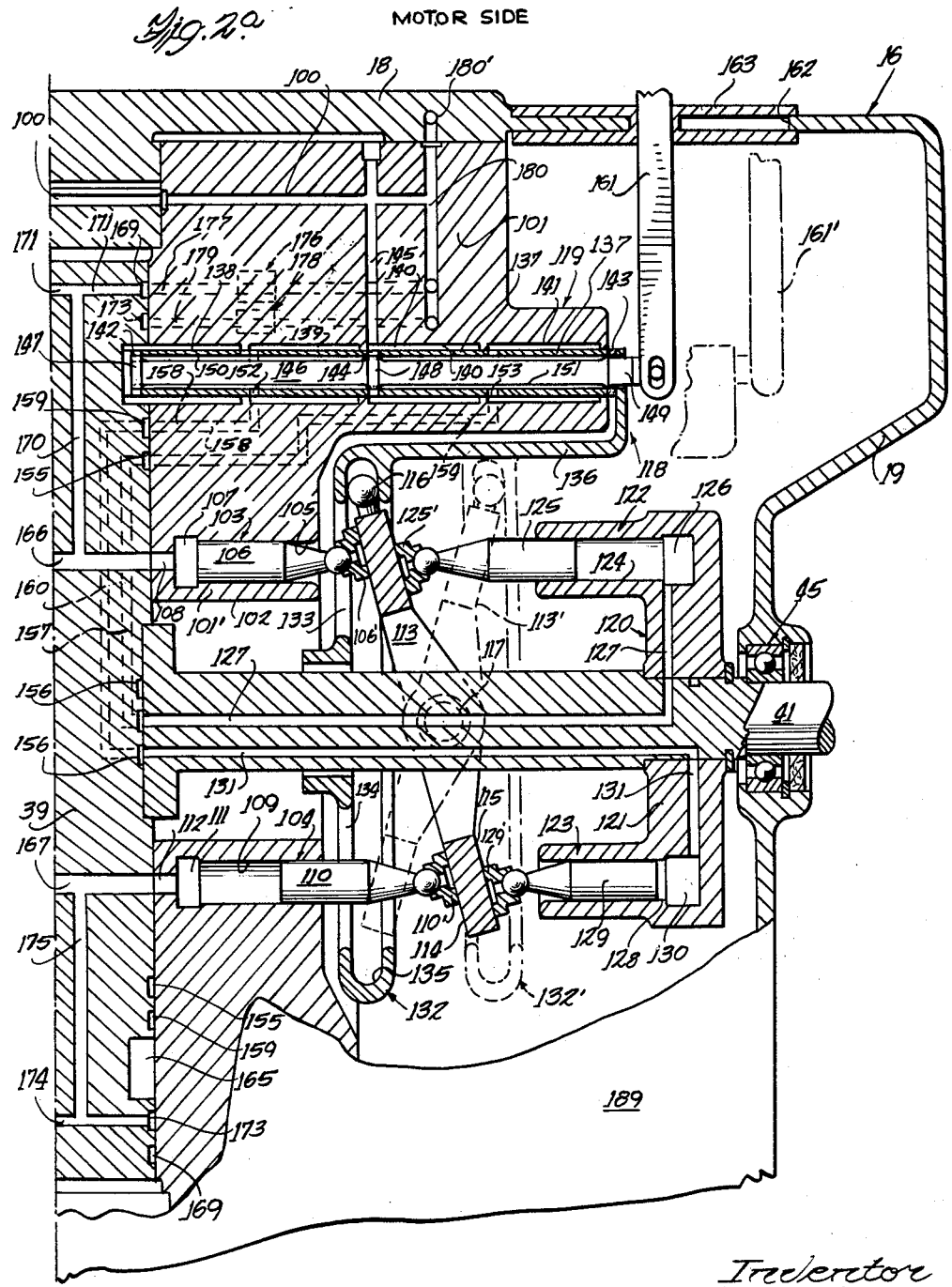

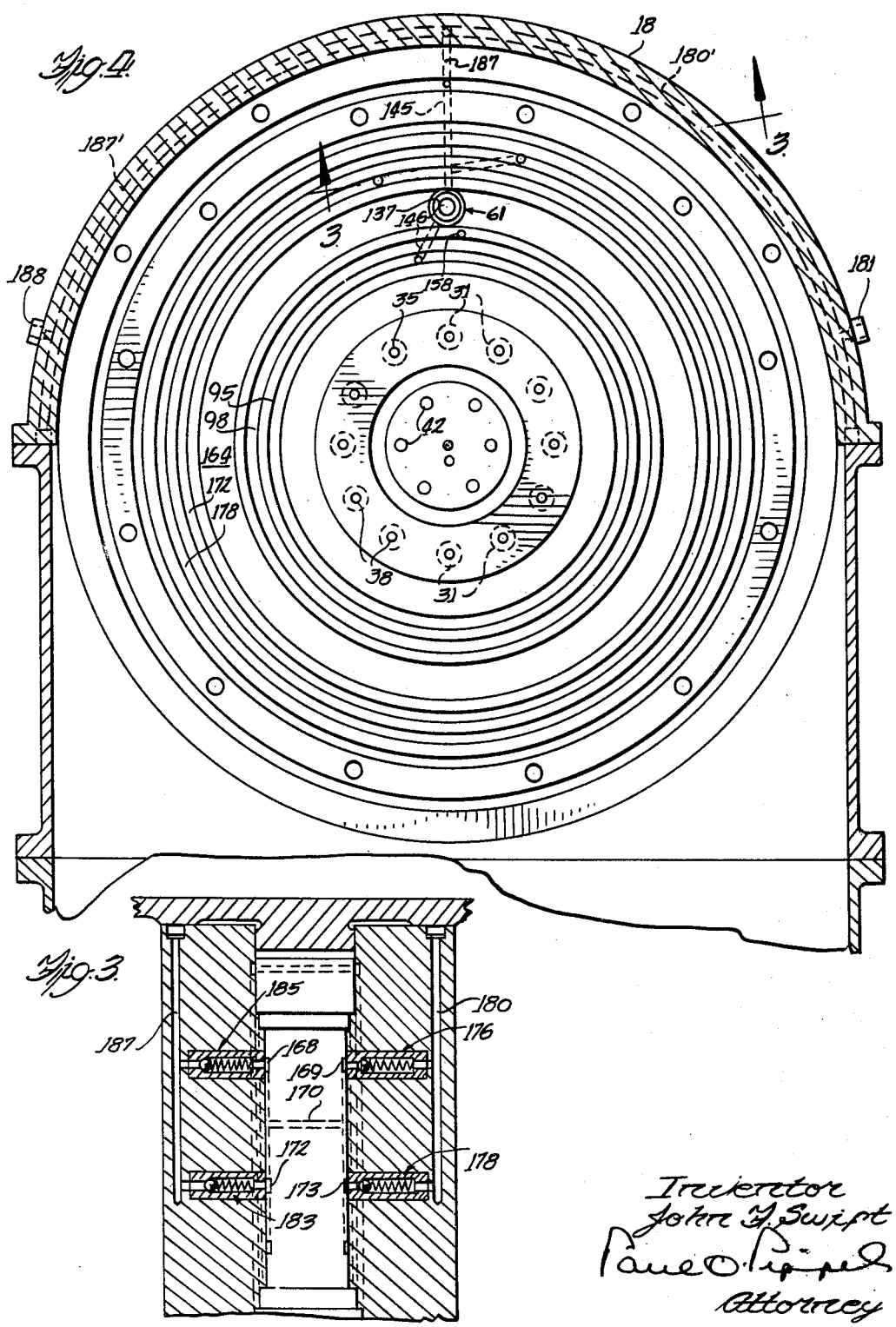

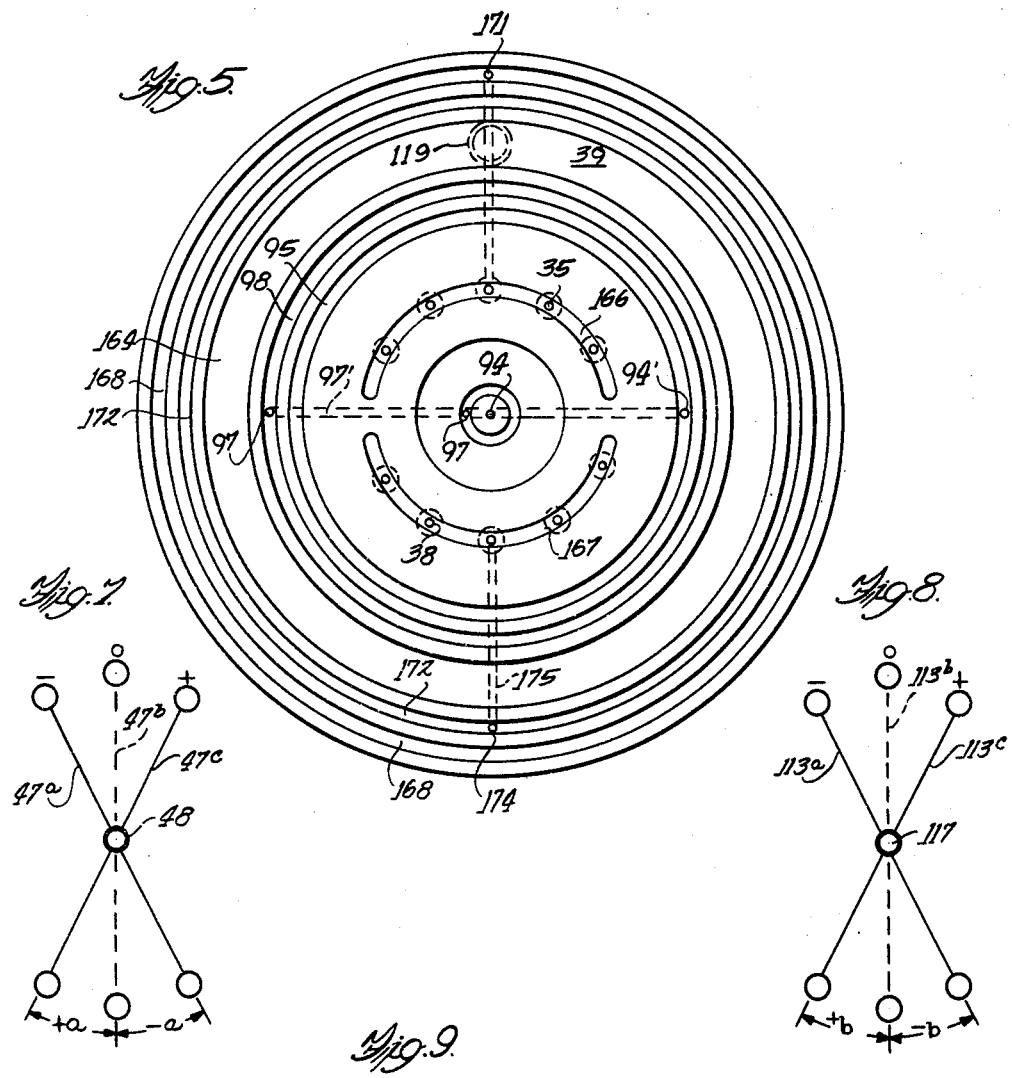

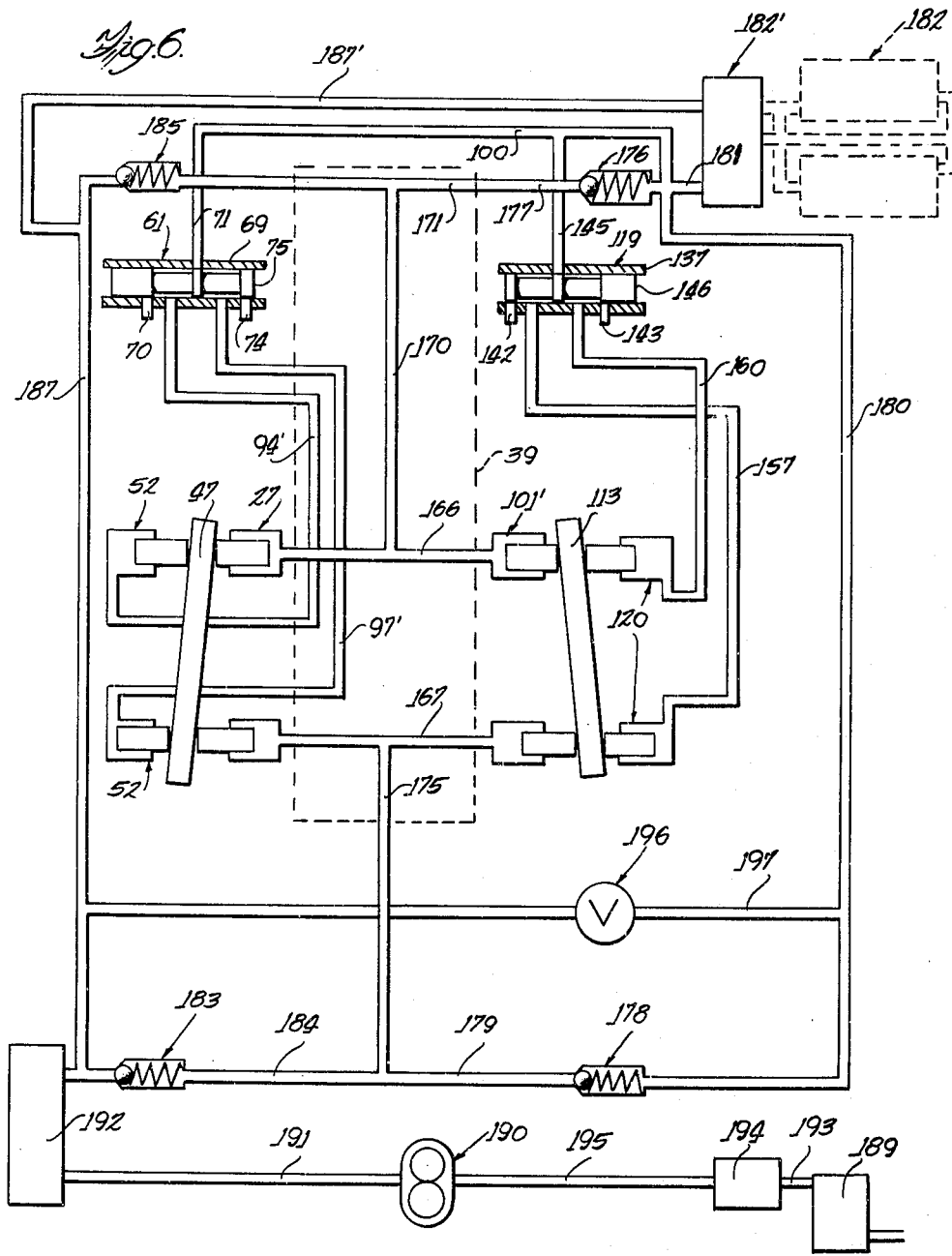

3,151,456
HYDROMECHANICAL POWER TRANSMISSION
MEANS WITH FLUID POWER TAKE-OFF
John F. Swift, Chicago, Ill., assignor to International
Harvester Company, Chicago, Ill., a corporation of
New Jersey
Filed Feb. 15, 1962, Ser. No. 173,392
20 Claims. (Cl. 60—53)

This invention relates to a hydromechanical power transmission device. More in particular this invention relates to an infinitely variable speed ratio hydromechanical transmission device having a power take-off means in the form of fluid under pressure.

Hydrostatic power transmission means differs from hydromechanical power transmission means in one major respect. The former means is entirely dependent upon the movement of fluid under pressure whereas the latter means divides the power train into two paths, partly mechanical and the balance being hydrostatic. Further, in the latter means the power train is entirely mechanical when the input and output shafts rotate in the same direction at equal speed (direct drive) for in such instance the hydrostatic system is under hydraulic lock.

Several constructions of hydromechanical transmissions are known but each lacks one or more desirable characteristics particularly in power transmission means for propelling vehicles which the present invention overcomes as will become apparent from the preferred embodiment herein described.

It is a prime object of the present invention to provide a hydromechanical power transmission device having power take-off means in the form of fluid under pressure.

An equally important object of this invention is to provide a hydromechanical power transmission device having infinitely variable speed ratios in the range between forward overdrive and reverse overdrive.

A further important object of this invention is to provide a hydromechanical power transmission device utilizable for hydraulically braking a vehicle and alternatively allowing the vehicle to coast.

Another important object of this invention is to provide a hydromechanical transmission device wherein the angular displacement of both swash plates are independently controlled adjustably.

These and other important and desirable objects inherent in and encompassed by the invention will be more readily understood from the ensuing description, the appended claims and the annexed drawings wherein:

FIGURE 1 is a vertical section, partly broken away, of the invention in assembled form taken through the longitudinal rotational axis of the transmission of this invention;

FIGURE 2 is an enlarged view of the leftward half or pump side of FIGURE 1 showing the construction in better detail;

FIGURE 2A is similar to that of FIGURE 2 but illustrating the rightward half or motor side of the transmission of FIGURE 1;

FIGURE 3 is a sectional view, partly broken away, taken on line 3—3 of FIGURE 4 illustrating the check valve arrangement required for the fluid lines;

FIGURE 4 is a sectional view taken on line 4—4 of FIGURE 1 illustrating further detailed structure of the transmission unit of this invention not apparent from other views in the drawings;

FIGURE 5 is a view of the rotatable valve member taken on line 5—5 of FIGURE 1 rotated 90° illustrating fluid passages and kidney valves;

FIGURE 6 is a schematic drawing the fluid circuits including the fluid power take-off and the charge pump;

FIGURES 7 and 8 are mathematical sketches for the theoretical discussion herein; and FIGURE 9 illustrates graphically the drive conditions attainable by the transmission of this invention.

CONSTRUCTION

With continued reference to the drawings it will be seen from FIGURE 1 that the hydromechanical transmission, generally indicated at 15, includes a stationary housing indicated at 16. For the purpose of assembly the housing 16 may consist of several members 17, 18 and 19 all secured rigidly as indicated such as by bolts (not shown). The bottom of the housing 16 is closed by an oil pan 20 secured thereto as by bolts, two of which are shown at 21 and 22.

Referring now to FIGURES 1 and 2 it will be seen that journalled to the housing member 17 is a power input shaft 23 supported conventionally by bearing 24 secured by a snap ring 25 and packing ring 26. The input shaft 23 is directly connected in drive relation to a pump carrier indicated at 27. The carrier 27 comprises an end bell 28 integral with the input shaft 23 and is rigidly connected to a generally hollow cylindrically shaped element 29 extending inwardly and terminating with an annular shaped portion or pump block 30. Thus the pump carrier 27 and its associated pump block 30 rotates with the input shaft 23.

The pump block 30 is provided with a plurality of longitudinally extending pump cylinder bores 31 in circumferential spaced relation. In the present embodiment twelve bores 31 are employed as may be evident from FIGURE 4. Disposed within each of the bores 31 is a pump piston, two of which are shown at 32 and 33 in FIGURE 2 forming pump cylinders. From this it will be apparent that all of the pump cylinders are constructed identically and thus only one will be described in detail.

On the inner end portion of the bore 31 with piston 32 is a pump chamber 34 as best seen in FIGURE 2. Each of the pump pistons such as 32 and 33 is provided with shoes such as 32' and 33' which are self-adjusting for sliding engagement in abutting relation with a highly machined annular face 49 of a swash plate 47. A longitudinal extending port 35 communicates the chamber 34 with the inner face 36 of the block 30. Likewise piston 33 in another bore 31 is provided with a pump chamber 37 and port 38 to the inner face 36. At this point it should be mentioned that the inner face 36 of the pump carrier 27 is highly machined for rotation in abutting relation with a rotatable valve plate 39 which plate will be described later herein.

Referring again to FIGURE 2 the end bell 28 of the pump carrier 27 is integral with the input shaft 23. Due to axial stresses in an outward direction of the carrier 27 a thrust bearing 40 is provided for preventing separation of the face 36 from the valve plate 39.

Referring now to FIGURES 1, 2 and 2A the power output shaft is in two sections 41 and 41' the inner ends of which are connected to the rotatable valve plate 39 as by bolts in longitudinal bores 42 (FIGURE 4). Thus the valve plate 39 rotates with the output shaft 41 and 41'.

The leftward end portion of the output shaft 41' as shown in FIGURE 2 is rotatably supported by a roller bearing 43 in a recess 44 of the input shaft 23. The rightward end portion of the output shaft 41 is rotatably supported in the bearing 45 mounted in the housing member 19 as illustrated in FIGURE 2A. It will also be pump seen from FIGURE 2 that the pump block 30 of the pump carrier 27 is supported by the output shaft 41' in journalled relation by the roller bearing 46.

Mounted pivotally on the output shaft 41' and constrained for rotation therewith is a pump swash plate indicated at 47. The swash plate 47 pivots at 48 on the output shaft 41' for transverse rotation or angular displacement as indicated at 47' in phantom lines. The swash plate 47 is provided with a pair of highly machined annular faces 49 and 50. Each of the pump pistons such as 32 is provided with a shoe 32' in ball and socket arrangement which shoe 32' abuts the face 49 of the swash plate 47 in sliding relation as seen best in FIGURE 2. From this it can be seen that when the swash plate 47 is displaced angularly as shown in full lines in FIGURE 2 each of the pump pistons such as 32 and 33 will reciprocate provided that the speed of rotation of the pump carrier 27 is different from that of the output shaft 41'. Means will now be described for hydraulically shifting the angular displacement of the swash plate 47 or maintaining the angular displacement thereof in a fixed relation. At this point it will be apparent that the magnitude of angular displacement of the swash plate 47 governs the stroke limits of the pump pistons such as 32 and 33.

Secured in rigid relation to the leftward end portion of the output shaft 41' is an auxiliary hydraulic motor generally indicated at 52 in FIGURE 2. The auxiliary motor 52 comprises an annular shaped cylinder block 53 having a pair of one-way acting hydraulic rams 54 and 55 disposed in approximately 180° relation as shown. The ram 54 is provided with a chamber 56 and a longitudinally movable piston 57. The piston 57 is provided with a self-adjusting shoe 57' abutting in slidable relation with the annular face 50 of the swash plate 47. Similarly the ram 55 has a chamber 58 and piston 59 with shoe 59' in slidable abutting engagement with the annular face 50 of the swash plate 47. It will also be observed from FIGURE 2 that the plane passing through the axes of pistons 57 and 59 is perpendicular to the axis of the pivot 48 for the swash plate 47. Further the cylinder block 53 of the auxiliary motor 52 is secured to the output shaft 41' and constrained for rotation therewith. Thus the auxiliary motor 52 rotates with the output shaft 41' and swash plate 47. From this it is apparent that appropriate actuation of hydraulic rams 54 and 55 will angularly displace the swash plate 47 from the position shown in heavy lines in FIGURE 2 to that indicated at 47' in phantom lines. It is equally apparent that the position of the pistons 57 and 59 of the auxiliary motor 52 governs the stroke limits of the pump pistons such as 32 and 33. Means will now be described for a servo-mechanism 60 which mechanism includes auxiliary motor 52 for controlling the angular displacement of the swash plate 47.

Again referring to FIGURE 2 it will be seen that the servo-mechanism 60 includes a servo-valve indicated at 61. The servo-valve 61 comprises an annular valve casing 62 mounted on the housing member 18 having an inner face 63 in slidable abutting relation with the face 64 for the rotatable valve plate 39. The casing 62 is provided with a longitudinally extending bore having four circumferential grooves 65, 66, 67 and 68. Within this bore in slidable relation is a valve sleeve 69 having ports 70, 71, 72, 73 and 74 as shown. Slidably disposed within the sleeve 69 is a spool valve 75 having circumferential grooves 76 and 77 and lands 78, 79 and 80 as illustrated. The outer end of the spool valve 75 is operatively connected to lever 81. A longitudinal slot 82 disposed in the housing 16 is provided to accommodate bifurcated element 83 slidably which element is secured to the lever 81. This arrangement permits the lever 81 with its associated bifurcated element 83 to move slidably in a longitudinal direction to the position shown at 81' in phantom lines. Thus shifting of the spool valve 75 is accomplished by shifting the lever 81 by external force, power or manual, applied thereto.

Disposed about the hollow cylindrically shaped element 29 of the pump carrier 27 in non-rotatable but slidable relation is an annular collar 84. The collar 84 is provided with a lobe 85 which is rigidly connected to the left end of the valve sleeve 69 as best seen in FIGURE 2. The collar 84 being non-rotatable is movable in an axial direction thus correspondingly moving the valve sleeve 69 axially. Further, the collar 84 is provided with an internally disposed annular groove 86 as shown.

The hollow cylindrically shaped element 29 of the pump carrier 27 is provided with three elongated apertures or slots, one of which is shown at 87 in FIGURE 2. These three elongated slots 87 are disposed in the element 29 at 120° apart circumferentially and extend in an axial direction. An axially slidable ring 88 is disposed in the inner periphery of the element 29 as shown. The ring 88 is provided with three radial projections 89 having a double bifurcated cross-section which coincides with the three slots 87. Thus the ring 88 is constrained for rotation with the carrier 27 but is movable axially within the longitudinal limits of the slots 87. One of the projections 89 in the ring 88 is provided with a radial extension having a ball 90 which ball slides in the annular groove 86 of the collar 84. From this it is apparent that when the rotating ring 88 moves axially it correspondingly moves the collar 84 and valve sleeve 69 longitudinally.

The rotating ring 88 in the carrier 27 is provided with an internal annular recess 91 similar to the groove 86. Disposed on the outer periphery of the swash plate 47 is a single radial projection 92 also having a ball 93 thereon. The ball 93 slides within the annular recess 91 of the ring 88. From this it will be apparent that if the angular displacement of the swash plate 47 moves toward the position 47' shown in phantom lines in FIGURE 2, the ball 93 thereon correspondingly shifts the ring 88 leftwardly. Leftward movement of the ring 88 correspondingly shifts the collar 84 and valve 69 leftwardly. Thus a mechanical sensing device has been described for actuating the valve sleeve 69 to correspond with the position of angular displacement of the swash plate 47. It will be noted however that the sensing device described does not impart or apply any force to the swash plate 47 but to the contrary the swash plate 47 actuates the sensing device. The hydraulic system for controlling the auxiliary motor 52 by the servo-valve 61 (servo-mechanism 60) will now be described.

Referring to FIGURE 2 it will be seen that chamber 56 of the hydraulic ram 54 (rotating auxiliary motor 52) communicates with a fluid passage 94 in the cylinder block 53 and output shaft 41'. The rotating valve plate 39 is provided with a generally radial passage 94' of which one end communicates with the passage 94 as best shown in FIGURE 2. The other end of the passage 94' communicates with an annular groove 95 which groove registers with passage 96 in the valve casing 62. The passage 96 in turn communicates with the circumferential groove 65 of the servo-valve 61 as shown in FIGURE 2. Similarly chamber 58 of the hydraulic ram 55 communicates with passage 97 in the cylinder block 53 and output shaft 41' as shown. The passage 97 communicates with one end of radial passage 97' in the rotatable valve plate 39. The other end of radial passage 97' communicates with annular groove 98. The groove 98 registers with passage 99 which in turn communicates with the circumferential groove 67 of the servo-mechanism 61. The operation of the servo-valve 61 for shifting the angular displacement of the swash plate 47 will now be described.

Referring again to FIGURE 2, hydraulic fluid under pressure in passage 100 within the valve casing 62 enters the circumferential groove 66 in the servo-valve 61. In the position illustrated in FIGURE 2 the circumferential groove 66 is closed because the land 79 of the spool valve 75 is in registry with port 72. Thus no fluid pressure flows from the passage 100 through the servo-valve 61. At the same time the rams 54 and 55 of the auxiliary motor 52 are under hydraulic lock for the following reasons. The passage 96 leading to the circumferential groove 65 of the servo-valve 61 communicates with circumferential groove 76 of the spool valve 75 through port 71 of the valve sleeve 69. However the circumferential groove 76 is not in registration with either drain port 70 or fluid pressure port 72. Likewise the passage 99 leading to the circumferential groove 77 of the servo-valve 61 communicates with the circumferential groove 67. The groove 67 in turn communicates with circumferential groove 77 of the spool valve 75. However, the groove 77 is not in registry with drain port 74 or fluid pressure port 72 in the valve sleeve 69. Thus the rams 54 and 55 are under hydraulic lock.

In the event the operator moves the lever 81 leftwardly to the position 81' shown in phantom lines in FIGURE 2 the spool valve 75 also shifts leftwardly wherein the land 79 moves out of registry with fluid pressure port 72 thus communicating fluid pressure from the passage 100 to circumferential groove 77. Pressurizing groove 77 in turn will pressure passages 99, 97' and 97 through port 73 and groove 67 to energize the ram 55. At the same time the land 78 of the spool valve 75 undercovers drain port 70 thereby permitting the ram 54 to exhaust through passages 94, 94', 96, groove 65, port 71 and groove 76. The auxiliary motor 52 thus energized displaces the swash plate 47 in a counter-clockwise direction as viewed in FIGURE 2 until the annular collar 84 is moved leftwardly sufficiently to register land 79 of spool valve 75 with port 72 of sleeve 69, or in other words the relative position of sleeve 69 with respect to the spool valve 75 is the same as that shown in FIGURE 2. From this it is clear that should any fluid leakage occur in the servomechanism 60 wherein the angular displacement of the swash plate 47 does not correspond precisely with the position of lever 81, the sleeve 69 will move in a direction to energize automatically the auxiliary motor 52 for correcting the position of the swash plate 47.

The foregoing describes the hydraulic pump side of the hydromechanical transmission 15 of this invention. A description of the motor side (FIGURE 2A) of the transmission 15 will now be made.

In FIGURE 2A there is shown a stationary member 101, mounted on the housing member 18, having a centrally located axial bore 102 for accommodating the rotatable output shaft 41 therethrough. The annular portion adjacent the bore 102 of the stationary member 101 is a motor block 101'. The motor block 101' is provided with a plurality of motor cylinders, two of which are indicated at 103 and 104. In the particular embodiment shown in the drawings twelve such motor cylinders are employed all being in circumferential spaced relation with respect to each other. Each of the motor cylinders are constructed the same and therefore only motor cylinders 103 and 104 will be described. The motor cylinder 103 comprises an axial motor cylinder bore 105 disposed in the motor block 101'. Slidably disposed within the bore 105 is a motor piston 106 pivotally connected to a shoe 106' in the same manner as that previously described for pump piston 32. The cylinder 103 also includes a fluid chamber 107 communicating with a port 108 in the block 101' as shown. In a similar manner the motor cylinder 104 comprises an axial bore 109 disposed in the motor block 101'. Slidably disposed within the bore 109 is a motor piston 110 pivotally connected to a shoe 110' in the same manner as that previously described for pump piston 33. The cylinder 104 also includes a fluid chamber 111 communicating with a port 112 in the block 101' as shown.

At this point it should be remembered that the pump block 30 rotates with the input shaft 23 but the motor block 101', to the contrary, is stationary. Thus the motor cylinders such as 103 and 104 do not rotate.

Pivotally mounted at 117 on the output shaft 41 is a motor swash plate 113 having a pair of highly machined smooth annular faces 114 and 115. The motor swash plate 113 is provided with a protruding element such as a ball 116 similar to the ball 93 of the previously described pump swash plate 47. From FIGURES 2 and 2A it will be seen that the motor swash plate 113 can be angularly displaced about its pivot 117 from the position shown in full lines to the position 113' shown in phantom lines. It will also be observed that the shoes 106' and 110' of pistons 106 and 110, respectively, engage slidably the face 114 of the motor swash plate 113. The means for controlling the position or angular displacement of the motor swash plate 113 will now be described.

In FIGURE 2A there is shown a second servomechanism, generally indicated at 118, comprising a second servo-valve 119 and a second auxiliary motor 120. The second auxiliary motor 120 comprises a cylinder block 121 constrained for rotation with output shaft 41 and having a pair of hydraulic rams 122 and 123 disposed in approximately 180° relation with respect to each other as shown. The ram 122 comprises an axial bore 124 in the block 121 having a piston 125 slidable therein. The piston 125 is pivotally connected to a shoe 125' slidably engaged with the annular face 115 of the motor swash plate 113 as illustrated. The ram 122 is provided with a fluid chamber 126 in communication with fluid passage 127 disposed in the block 121 and output shaft 41. Likewise the ram 123 comprises an axial bore 128 in the block 121 having a piston 129 slidable therein. The piston 129 is pivotally connected to a shoe 129' slidably engaged with the annular face 115 of the motor swash plate 113 as shown. The ram 123 is provided with a fluid chamber 130 in communication with fluid passage 131 disposed in the block 121 and output shaft 41. From this it can be seen that by controlling flow or movement of hydraulic fluid in the passages 127 and 131 the positions of pistons 125 and 129 can be controlled. Further it is apparent that the auxiliary motor 120 controls the angular displacement of the swash plate 113 about its pivot 117 from the position shown in full lines in FIGURE 2A to the position 113' illustrated in phantom lines. Means will now be described for sensing the angular displacement of the swash plate 113 and controllably shifting its angular displacement.

Journalled to and supported by the output shaft 41 is a generally circular shaped element or ring 132 which is non-rotatable but is movable axially with respect to the output shaft 41. The ring 132 is provided with longitudinal holes, two of which are shown at 133 and 134 in FIGURE 2A. The hole 133 accommodates piston 106 and its associated shoe 106' therethrough and the hole 134 accommodates the piston 110 and its associated shoe 110'. Similar holes in the ring 132 are provided for accommodating each of the motor pistons in the same manner. The ring 132 is provided with an inner annular groove or circular recess 135 within which is positioned the ball 116 protruding from the outer peripheral surface of the motor swash plate 113. Thus from FIGURE 2A it can be seen that the ring 132 will move axially when the angular displacement of the motor swash plate 113 is changed from one position to another as indicated at 132' in phantom lines.

Connected to the outer periphery of the ring 132 is a lobe 136 which is integrally connected to a second valve sleeve 137 of the second servo-valve 119. The servo-valve 119 comprises a longitudinal bore in the stationary member 101 having four circumferential grooves 138, 139, 140 and 141 supporting slidably the second valve sleeve 137. Ports 142 and 143 at the ends of the sleeve 137 are drain ports and port 144 is a fluid pressure inlet port. The groove 138 communicates with drain port 142 and the fluid pressure passage 145 communicates with groove 140. Within the second valve sleeve 137 in slidable relation thereto is a spool valve 146 having lands 147, 148 and 149 with circumferential grooves 150 and 151. The sleeve 137 is also provided with port 152 leading to groove 139 and port 153 leading to groove 141 as shown in FIGURE 2A.

Disposed in the stationary member 101 is a fluid passage 154 communicating the groove 141 with an annular groove 155 in the rotatable valve plate 39. The annular groove 155 communicates with passage 127 in the output shaft 41 through fluid passage 157 as shown. In a similar manner fluid passage 158 in the stationary member 101 communicates groove 139 with an annular groove 159 in the rotatable valve member 39. The annular groove 159 communicates with passage 131 in the output shaft 41 through passage 160 and annular groove 156 in the rotatable valve plate 39. Thus groove 141 of the servo-valve 119 is in communication with chamber 126 of the ram 122 and the groove 139 is in communication with the chamber 130 of the ram 123.

The second servo-valve 119 includes a lever 161 operatively connected to the spool valve 146. Similar to the lever 81, the lever 161 extends externally of the housing 16 as shown. The housing member 19 is provided with a longitudinal slot 162 for slidable accommodation of bifurcated element 163 which element is connected to the lever 161. This arrangement permits the lever 161 to be shifted longitudinally to the position 161' as indicated in phantom lines in FIGURE 2A.

The servo-mechanism 118 as shown in FIGURE 2A is in equilibrium wherein no fluid flows from the inlet pressure passage 145 and the rams 122 and 123 of the second auxiliary motor 120 are under hydraulic lock. In this condition the port 144 of the sleeve valve 137 is in registry with land 148 of the spool valve 146. The circumferential groove 151 in the spool valve 146 is not in registry with any port except port 153 in the sleeve 137 which port communicates with chamber 126 of ram 122. Thus the ram 122 is under hydraulic lock. Likewise the circumferential groove 150 is not in communication with any other port except port 152 in the sleeve 137 which port communicates with the chamber 130 of ram 123. Thus the ram 123 is under hydraulic lock.

In the position shown in full lines in FIGURE 2A the motor swash plate 113 is in its extreme counterclockwise position. If the operator wishes to shift the angular displacement of the swash plate 113 to the position 113', for example, shown in phantom lines he moves the lever 161 to the position 161' also shown in phantom lines. Shifting of lever 161 rightwardly moves the spool valve 146 correspondingly. This moves land 148 out of registry with port 144 and thus fluid under pressure from passage 145 and groove 140 is admitted to circumferential groove 150. Since the groove 150 communicates with chamber 130 the ram 123 is energized in the direction to rotate the swash plate 113 clockwise. At the same time land 149 of the spool valve 146 moves out of registry with drain port 143 thereby opening the groove 151 to drain. Since groove 151 communicates with chamber 126 the ram 122 may exhaust and thus retract. Now as the motor swash plate 113 rotates clockwise the sensing ring 132 and its associated sleeve valve 137 also move rightwardly until the sleeve 137 and spool valve 146 are again in the same relative position with respect to each other as shown in FIGURE 2A and when thusly reached the auxiliary motor 120 will again be under hydraulic lock but the swash plate 113 will have moved to the position 113'. Should fluid leakage occur whereby the swash plate 113 moves out of its corresponding position, the sensing ring 132 will likewise move the sleeve valve 137 and the auxiliary motor 120 will be energized in a direction to correct the position of the swash plate 113 automatically.

The foregoing describes the pump swash plate 47 and motor swash plate 113 and the means for controlling their respective angular displacements independently of each other by external control through independent operation of levers 81 and 161. It is obvious from the above description that the levers 81 and 161 may be shifted manually, mechanically, or by suitable power means such as hydraulic rams if desired. A further description of the rotatable valve plate 39 will now be made.

Referring to FIGURES 1, 2, 2A and 5 it will be seen that the rotatable valve plate 39 is annular in shape. An annular groove 164 is provided to accommodate the rightward end portion of the first servo-valve 61 and another similar annular groove 165 for accommodating the leftward end portion of the second servo-valve 119.

It will be observed that approximately half of the number of pump chambers communicate with approximately half of the number of motor chambers through the valve opening 166 in the rotatable plate valve 39. For example, pump chamber 34 communicates with motor chamber 107 through port 35, valve opening 166 in the plate 39, and port 108. Likewise, approximately the remaining half of the number of pump chambers communicate with the corresponding motor chambers. For example the pump chamber 37 communicates with motor chamber 111 through port 38, valve opening 167 in the plate 39, and port 112. In FIGURE 5 it will be seen that the valve openings 166 and 167 are generally semi-circular in shape and frequently referred to in the art as "kidney valves." The flow of hydraulic fluid in one of the valve openings 166 or 167 is always in counter-current direction with respect to the flow in the other valve opening.

The valve opening 166 communicates with a pair of annular grooves 168 and 169 in the rotatable valve plate 39 through passages 170 and 171 as shown. Likewise the valve opening 167 communicates with a pair of annular grooves 172 and 173 in the valve plate 39 through passages 174 and 175 as shown. The purpose of these passages and annular grooves is to provide means for obtaining fluid under pressure for external uses, including return means therefor, such as hydraulically powered vehicle accessories 182 and control valve 182' (FIGURE 6) therefor. Examples of such accessories are bulldozer shovels, implement depth control devices, hydraulic hoists and the like. The means for establishing external fluid communication with the valve openings 166 and 167 in the rotatable valve plate 39 will now be described.

Referring to FIGURES 2A, 3 and 6 it will be seen that the annular groove 169 in the rotatable valve plate 39 communicates with the inlet side of a check valve 176 through passage 177. In a similar manner the annular groove 173 communicates with the inlet side of a second check valve 178 through passage 179. The outlet sides of check valves 176 and 178 are communicatively connected to passage 180 in the stationary block 101 which passage 180 communicates with circumferential passage 180' in the housing member 18 as best seen in FIGURE 4. The passage 180' leads externally to port 181 which port provides the source of hydraulic pressure for operating hydraulic accessories 182 as indicated best in FIGURE 4.

The passage 180 communicates with passage 100 which in turn communicates with passage 145 (FIGURE 2A) and thus provides a source of hydraulic pressure for operation of servo-mechanisms 60 and 118 as previously described.

Referring to FIGURES 2, 3 and 6 the annular groove 172 in the rotatable valve plate 39 communicates with the outlet side of a third check valve 183 through passage 184. In a similar manner the annular groove 168 communicates with the outlet side of a fourth check valve 185 through passage 186. The inlet sides of check valves 183 and 185 are communicatively connected to passage 187 in the stationary member 62 which passage 187 communicates with circumferential passage 187' in the housing member 18 as best seen in FIGURE 4. The passage 187' leads externally to port 188 which port provides the fluid return means from the hydraulic accessories 182 indicated in FIGURE 6. Thus fluid return means for the hydraulic power take-off from the transmission 15 has been shown and described. It will be noted here that the above described hydraulic power take-off return means leads directly back to the transmission 15 and not into a sump 189 at the bottom of the unit. At this point it is stated that the only fluid returned to the sump 189 is from fluid leakage and from the drain ports 70, 74, 142 and 143 of the servo-mechanisms 60 and 118.

The system of check valves and passages just described performs a unique function in that the input power shaft 23 may rotate in either direction and yet in either instance the high pressure fluid results in passages 180, 180' and 181 and the low pressure return flow remains in passages 187, 187' and 188. This is accomplished in the following manner.

Referring to FIGURE 6 it will be apparent that when the input shaft 23 rotates the pump carrier 27 in one direction, assuming that the pump swash plate 47 is not in perpendicular position and further assuming that the motor swash plate 113 is not positioned for direct drive (i.e. 1:1 speed ratio), the high pressure hydraulic fluid will be in the valve opening 166 of the rotatable valve plate 39 and, conversely, the low pressure will be in the valve opening 167. The high pressure fluid from the valve opening 166 passes through the check valve 176 which pressurizes passages 100, 180 and 181. No fluid flow occurs in passage 180' because check valve 178 remains closed. Passage 100 provides fluid pressure for operation of the first auxiliary motor 52 through the first servo-valve 61 and also provides fluid pressure, through connecting passage 145, for operation of the second auxiliary motor 120 through the second servo-valve 119 as previously described. The passage 181 leads to the control valve 182' for operating the hydraulic power take-off accessories 182. The low pressure return flow from the power take-off accessories 182 passes through the third check valve 183 through passages 187' and 187. From the check valve 183 the return flow passes to the valve opening 167 in the rotatable valve plate 39 through passages 184 and 175. The check valves 178 and 185 remain closed because of high pressure on the outlet sides thereof.

Now in the event that the input shaft 23 with pump carrier 27 rotates in the opposite direction from that just described, the valve opening 167 in the rotatable valve plate 39 will be under high pressure while that in the valve opening 166 will be at low pressure. High pressure fluid from the valve opening 167 passes through the second check valve 178 through passages 175 and 179 which then pressurizes the passage 180. The high pressure fluid in the passage 180 maintains the first check valve 176 closed. The high pressure fluid in passage 180 feeds the first and second servo-valves 61 and 119 and the control valve 182' for the power take-off accessories 182 as previously described. The low pressure return flow from the power take-off accessories 182 passes through the fourth check valve 185 through passages 187' and 187. From the fourth check valve 185 the low pressure fluid returns to the valve opening 166 in the rotatable valve plate 39 through passages 171 and 170. The check valves 176 and 183 remain closed due to high pressure fluid on the outlet sides thereof.

From the foregoing it is seen that the input shaft 23 may be driven in either direction and the check valves operate automatically to provide high pressure fluid for operating the auxiliary motors 52 and 120 and also the power take-off accessories 182. This will also be true in case the vehicle changes from "drive" to "coast."

It may now be appreciated that if the swash plates 47 and 113 are in perpendicular position, the output shaft 41 may be rotated freely (coast) and independent of the input shaft 23 for there will be no reciprocation of the pump pistons (i.e. 32 and 33) or motor pistons (i.e. 106 and 110). In such condition it is obvious that no fluid pressure differential exists between the valve openings 166 and 167 in the rotatable valve plate 39 and thus no fluid pressure would be available to energize the auxiliary motors 52 and 120 for altering the positions of the swash plates 47 and 113. Further the hydraulic system of the transmission just described does not provide for replenishment of fluid lost to the sump 189 through leakage or the loss of fluid from the drain ports of the servo-valves 61 and 119 through operation thereof. In order to overcome these above mentioned difficulties a charge pump 190 is connected in driven relation with the input shaft 23. The outlet side of the charge pump 190 communicates with the low pressure passages 187 and 187' through passage 191 and filter 192 as shown best in FIGURES 1 and 6. The inlet side of the charge pump 190 communicates with the sump 189 through passage 193, strainer 194 and passage 195. The charge pump 190 may be of any conventional type such as a gear pump. However, it should be pointed out that reverse direction operation of the input shaft 23 requires a valve (not shown) for correspondingly reversing the inlet and outlet passages 195 and 191 of the charge pump 190. Alternatively this may be accomplished automatically by a system of check valves arranged to function in the same manner as that described for check valves 176, 178, 183 and 185. Thus the charge pump 190 furnishes fluid under pressure to servo-valves 61 and 119 through passages 191, 184, 179, 180 to 100 for actuation of auxiliary motors 52 and 120.

When the angular displacements of one or both swash plates 47 and 113 is desired there must be means provided for exhausting fluid from the valve openings 166 and 167 as otherwise the fluid therein is under potentially hydraulic lock unless the control valve 182' for the hydraulic accessories 182 is opened. Ordinarily normal fluid leakage is relied upon to prevent the occurrence of such hydraulic locking. However, to facilitate the ease of altering displacement of the swash plates 47 and 113 a fluid by-pass having an hydraulic valve 196 is provided between the high pressure side such as passage 180 and the low pressure side 187. Referring to FIGURE 6 an externally operable conventional manual valve 196 is communicatively connected to passage 180 through passage 197 and the other side of the valve 196 communicatively connected to passage 187. United States Patent No. 2,569,562 to Douglas F. Froebe illustrates one form of such a valve 196 and its by-pass arrangement.

Insofar as the operation of the transmission 15 is concerned it is pointed out that the power train between the input shaft 23 and the output shaft 41 is split into two parts when the two shafts are rotating at different speeds. Part of the power train resulting from the movement of hydraulic fluid between the pump cylinders and motor cylinders is hydrostatic power transmission and the balance is mechanical. When the input shaft 23 speed is equal to the output shaft 41 speed in the same direction the hydraulic fluid between the two sets of cylinders is under hydraulic lock, no fluid flow occurring in valve openings 166 and 167, and thus the transmission of power is entirely mechanical. On the other hand the greater the proportional difference in speeds of the two shafts the hydrostatic power transmission correspondingly increases. It is well known to those skilled in the art that mechanical power transmission is more efficient than hydrostatic transmission and thus a hydromechanical power transmission system as described herein possesses a higher efficiency than a totally hydrostatic transmission system. The operating characteristics of the hydromechanical transmission 15 of this invention will now be described.

Reference is now directed to FIGURES 7, 8 and 9. In FIGURE 7 the maximum counter-clockwise inclination of the pump swash plate 47 is indicated at 47a and the angle $-a$ it makes with the dotted vertical line indicated at 47b. Likewise the maximum clockwise inclination of the pump swash plate 47 is indicated at 47c and the angle $+a$ it makes with the dotted line 47b. Omitting for the moment the mathematical sign ($+$ or $-$)

it will be appreciated that as the numerical value in degrees of the angle $a$ decreases, the fluid displacement of the pump cylinders per revolution of the input shaft 23 also decreases because the stroke of the pump pistons is correspondingly shortened. In FIGURE 8 the maximum counter-clockwise inclination of the motor swash plate 113 is indicated at 113a and the angle $-b$ it makes with the dotted vertical line indicated at 113b. The maximum clockwise inclination of the motor swash plate 113 is indicated at 113c and the angle $+b$ it makes with the dotted line 113b. Again omitting for the moment the mathematical sign (+ or −) it will be appreciated that as the numerical value in degrees of the angle $b$ decreases, the fluid displacement of the motor cylinders per revolution of the output shaft 41 also decreases because the stroke of the motor pistons is correspondingly shortened. Thus when the angle $a$ is zero the pump pistons do not reciprocate and similarly when the angle $b$ is zero the motor pistons do not reciprocate. At this point it is mentioned that the positions of the swash plates represented in FIGURES 7 and 8 refer to the same plane as that of FIGURES 1, 2 and 2A as evidenced by the pivots 48 and 117.

Referring to FIGURE 9 it will be seen that there are five conditions of operation A, B, C, D and E, of the transmission 15 depending upon the inclination of one swash plate with respect to the other. In the following discussion of each of these five operating conditions, no account is taken for any losses due to fluid leakage or friction. Further the following nomenclature or symbols are employed.

$N_1$ is the speed of the input shaft 23 (r.p.m.)
$N_2$ is the speed of the output shaft 41 (r.p.m.)
$D_1$ is the displacement of the pump cylinders per revolution of the input shaft 23 (cubic inches)
$D_2$ is the displacement of the motor cylinders per revolution of the output shaft 41 (cubic inches)
Q is the flow of fluid at high pressure for external use (cubic inches per minute)
$T_1$ is the torque applied to the input shaft 23
$T_2$ is the torque delivered to the output shaft 41
$a$ is the angle of inclination of the pump swash plate 47 (degrees)
$b$ is the angle of inclination of the motor swash plate 113 (degrees)

Condition A

In this condition the angles of inclination of both swash plates are negative or positive. Five results are possible depending upon the magnitude of inclination of one swash plate with respect to the other.

The speed ratio is:

$$\frac{N_2}{N_1} = \frac{N_1 D_1 - Q}{N_1[D_1 - D_2]}$$

and the torque ratio is:

$$\frac{T_2}{T_1} = 1 - \frac{D_2}{D_1}$$

and $D_1$, $D_2$ and Q each are not equal to zero.

If $D_1$ is greater than $D_2$, the torque ratio is greater than zero but less than one and the output shaft 41 rotates in the same direction as that of the input shaft 23 but at a greater speed (i.e. forward overdrive).

If $D_1$ is less than $D_2$ and the torque ratio is less than zero but greater than −1, the output shaft 41 rotates in the opposite direction to that of the input shaft 23 but at a greater speed (i.e. reverse overdrive).

If $D_1$ is less than $D_2$ and the torque ratio is less than −1 the output shaft 41 rotates in the opposite direction to that of the input shaft 23 but at a lower speed (i.e. reverse underdrive).

If $D_2$ is twice as great as $D_1$ then the torque ratio will be equal to −1 and the output shaft 41 rotates at the same speed as that of the input shaft 23 but in the opposite direction (i.e. reverse 1:1 speed ratio drive).

If $D_1$ is equal to $D_2$ the torque ratio is zero the transmission 15 is in neutral whereby no power is transmitted from the input shaft 23 to the output shaft 41.

Condition B

In this condition the angle of inclination $a$ of the pump swash plate 47 is zero and the angle of inclination $b$ of the motor swash plate is not equal to zero. In this condition the pump pistons do not reciprocate (i.e. displacement is zero) and thus the input shaft 23 is freely rotatable. The motor pistons will reciprocate if the output shaft 41 is drivenly rotated, such as in the vehicle coasting, provided however that the fluid thus pumped is permitted to exhaust. Exhausting of such fluid thus pumped by the motor cylinders may be through operation of the hydraulic accessories 182 or opening of the by-pass valve 196 (FIGURE 6). If both valves 182′ and 196 are closed the output shaft 41 may not rotate because the system is under hydraulic lock. On the other hand if the by-pass valve 196 is opened wide for free flow of fluid therethrough the vehicle may coast for the output shaft 41 is rotatable. Thus with the opened by-pass valve 196 the transmission 15 is in neutral. At this point it may be appreciated that by controllably restricting the fluid flow through the by-pass valve 196, the vehicle may be effectively braked, for such restriction proportionately regulates the resistance to rotation of the output shaft 41.

In this condition the speed ratio is:

$$\frac{N_2}{N_1} = \frac{-Q}{N_1 D_2}$$

where Q also represents the fluid flow through the by-pass valve 196 (cubic inches per minute), and $D_1$ is equal to zero but $D_2$ and Q are not equal to zero, and the torque $T_2/T_1$ ratio is undefinable in that mathematically it is infinite.

Condition C

In this condition one swash plate is positioned clockwise from the vertical while the other is positioned counter-clockwise from the vertical. In other words if the inclination angle $a$ is negative then the inclination angle $b$ is positive, and vice versa.

In this condition the speed ratio is:

$$\frac{N_2}{N_1} = \frac{N_1 D_1 - Q}{N_1[D_1 + D_2]}$$

where $D_1$, $D_2$ or Q do not equal zero—and the torque ratio is:

$$\frac{T_2}{T_1} = 1 + \frac{D_2}{D_1}$$

The result of this condition is that the output shaft 41 rotates in the same direction at a lower speed rate than that of the input shaft 23 (i.e. forward underdrive).

Condition D

In this condition the motor swash plate 113 is in vertical position and thus the motor pistons do not reciprocate but the pump swash plate 47 inclination is either clockwise or counter-clockwise from the vertical. In other words inclination angle $b$ is zero but inclination angle $a$ is not equal to zero. In this condition the speed ratio is:

$$\frac{N_2}{N_1} = 1 - \frac{Q}{N_1 D_1}$$

and $D_1$ is not equal to zero but $D_2$ and Q are equal to zero.

The torque ratio is:

$$\frac{T_2}{T_1} = 1$$

In this condition the output shaft 41 rotates in the same direction and at the same speed as the input shaft 23 (i.e. direct forward drive). It will be noted here that the entire transmission of power is mechanical for the fluid system is under hydraulic lock and thus there is no flow of fluid. However, if fluid power take-off is required then the speed ratio will be less than one but the transmission of power from the input shaft 23 to the output shaft 41 remains entirely mechanical.

Condition E

In this condition both swash plates are vertically positioned. In other words the inclination angles $a$ and $b$ are both equal to zero. It will be seen that in such condition the pump pistons and the motor pistons do not reciprocate. Thus there is no fluid movement and no fluid pressure is developed. In this condition the transmission 15 is in neutral and the input shaft 23 and the output shaft 41 may be freely rotated independent of each other.

From the foregoing it will be apparent that the fluid pressure and displacement available for external power take-off use is a function of the resistance to rotation of the output shaft 41. Thus in order to operate the transmission 15 solely as a fluid pump for power take-off purposes at maximum pressure and displacement the output shaft 41 must be externally locked against rotation such as by an external brake connected to the output shaft 41. In a vehicle employing the transmission 15 output shaft 41 may conveniently be locked against rotation by an appropriate emergency brake.

Having now described an embodiment of the invention it can now be seen that the objects of the invention have been fully achieved and it must be understood that changes and modifications may be made which do not depart from the spirit of the invention as disclosed nor from the scope thereof as defined in the appended claims.

What is claimed is:

1. An infinitely variable speed ratio hydro-mechanical power transmission with fluid power take-off means comprising a housing, an input shaft and an output shaft journalled for coaxial rotation, a multi-cylinder variable displacement hydraulic rotary pump constrained for rotation with said input shaft and a multi-cylinder variable displacement hydraulic stationary motor mounted on said housing, a pump swash plate and a motor swash plate mounted on said output shaft and constrained for rotation therewith, said pump swash plate being positioned in cooperative relation for actuating said pump and said motor swash plate being positioned in driven relation with said motor, a first auxiliary hydraulic linear motor and a second auxiliary hydraulic linear motor constrained for rotation with said output shaft, said first auxiliary motor being positioned to adjust the angle of inclination of said pump swash plate of controlling the displacement of said pump and said second auxiliary motor being positioned to adjust the angle of inclination of said motor swash plate for controlling the displacement of said stationary motor, a first servo-valve having an externally operable first lever mounted on said housing, first fluid passages communicatively connecting said first auxiliary motor operatively with said servo-valve, a second servo-valve independent of said first servo-valve having an externally operable second lever mounted in said housing, second fluid passages communicatively connecting said second auxiliary motor operatively with said second servo-valve, a source of hydraulic pressure connected to each of said servo-valves, a valve plate constrained for rotation with said output shaft and positioned between said rotary pump and stationary motor, fluid openings disposed in said valve plate positioned cooperatively for operatively communicating fluid flow between the cylinders of said rotary pump with the cylinders of said stationary motor, externally operable fluid bypass valve means positioned for interconnecting said fluid openings, fluid power take-off passages disposed in said valve plate and said housing communicatively connecting said fluid openings operatively with an external fluid power receiver whereby said transmission is capable of providing fluid power take-off, and said output shaft speed may be infinitely varied between overdrive forward speed to overdrive reverse speed in respect to said input shaft by operating externally said levers to control independently the inclination of each of said swash plates.

2. A hydromechanical power transmission with fluid power take-off comprising a housing, an input shaft and an output shaft journalled for coaxial rotation, a multi-cylinder variable displacement hydraulic rotary pump constrained for rotation with said input shaft and a multi-cylinder variable displacement hydraulic stationary motor mounted on said housing, a pump swash plate and a motor swash plate mounted on said output shaft and constrained for rotation therewith, said pump swash plate being positioned for actuating said pump and said motor swash plate being positioned in driven relation with said motor, a first auxiliary hydraulic motor and a second auxiliary hydraulic motor constrained for rotation with said output shaft, said first auxiliary motor being positioned to adjust selectively the angle of inclination of said pump swash plate for controlling the displacement of said pump and said second auxiliary motor being positioned to adjust selectively the angle of inclination of said motor swash plate for controlling the displacement of said stationary motor, a first servo-valve having an externally operable first control means mounted on said housing, first fluid passages operatively connecting said first auxiliary motor with said first servo-valve, a second servo-valve having an externally operable second control means mounted on said housing, second fluid passages operatively connecting said second auxiliary motor with said second servo-valve, a source of fluid pressure operatively connected to said servo-valves to energize controllably said auxiliary motors for adjustably controlling independently the angle of inclination of each of said swash plates, a valve plate constrained for rotation with said output shaft and positioned between said pump and stationary motor, fluid openings disposed in said valve plate positioned cooperatively for communicating fluid flow between the cylinders of said pump with the cylinders of said stationary motor, fluid power take-off passages disposed in said valve plate and said housing communicatively connecting said fluid openings operatively with an external fluid power receiver, a fluid flow check valve system interposed in said power take-off passages positioned for directing power take-off fluid flow unidirectionally irrespective of direction of rotation of said shafts whereby said transmission is capable of providing fluid power take-off, and by appropriate operation of each of said control means the driven speed of said output shaft in respect to said input shaft speed may be infinitely varied between forward overdrive speed and reverse overdrive speed, neutral and braking of said output shaft.

3. A transmission according to claim 2 wherein each of the servo-valves is provided with mechanical means for sensing the angular inclination of its associated swash plate whereby each servo-valve is actuated in a direction to correct automatically any change in angular inclination of said swash plate inconsistent with the selected position of its control means.

4. A transmission according to claim 2 wherein an externally operable bypass valve is interposed in the fluid power take-off passages for interconnecting the fluid openings of the valve plate.

5. A hydromechanical power transmission with fluid power take-off comprising a housing, an input shaft and an output shaft journalled for coaxial rotation, a multi-cylinder variable displacement hydraulic pump constrained for rotation with said input shaft and a multi-cylinder variable displacement hydraulic stationary motor mounted on said housing, a pump swash plate and a motor swash plate mounted on said output shaft and constrained for rotation therewith, said pump swash plate being positioned for actuating said pump and said motor swash plate being positioned in driven relation with said motor, an auxiliary hydraulic motor constrained for rotation with said output shaft and positioned to adjust selectively the angle of inclination of one of said swash plates and externally operable second means disposed in said housing positioned to adjust selectively the angle of inclination of the other of said swash plates for controlling independently the displacements of said pump and stationary motor, a servo-valve having an externally operable first control means mounted on said housing, fluid passages operatively connecting said auxiliary motor with said servo-valve, a source of fluid pressure operatively connected to said servo-valve to energize controllably said auxiliary motor, a valve plate constrained for rotation with said output shaft and positioned between said pump and stationary motor, fluid openings disposed in said valve plate positioned cooperatively for communicating fluid flow between the cylinders of said pump with the cylinders of said stationary motor, fluid power take-off passages disposed in said valve plate and said housing communicatively connecting said fluid openings operatively with an external fluid power receiver, a fluid flow check valve system interposed in said power take-off passages positioned for directing power take-off fluid flow unidirectionally irrespective of direction of rotation of said shafts whereby said transmission is provided with fluid power take-off, and by appropriate operation of each of said control means the driven speed of said output shaft in respect to said input shaft speed may be infinitely varied between forward overdrive speed and reverse overdrive speed, neutral and braking of said output shaft.

6. A transmission according to claim 5 wherein the servo-valve is provided with mechanical means for sensing the angular inclination of its associated swash plate whereby the servo-valve is actuated in a direction to correct automatically any change in angular inclination of said swash plate inconsistent with the position of its control means.

7. A hydromechanical power transmission with fluid power take-off comprising a housing, an input shaft and an output shaft journaled for coaxial rotaton, a multi-cylinder variable displacement hydraulic rotary pump constrained for rotation with said input shaft and a multi-cylinder variable displacement hydraulic stationary motor mounted on said housing, a pump swash plate and a motor swash plate mounted on said output shaft and constrained for rotation therewith, said pump swash plate being positioned for actuating said pump and said motor swash plate being positioned in driven relation with said motor, a first auxiliary hydraulic motor and a second auxiliary hydraulic motor constrained for rotation with said output shaft, said first auxiliary motor being positioned to adjust selectively the angle of inclination of said pump swash plate for controlling the displacement of said pump and said second auxiliary motor being positioned to adjust selectively the angle of inclination of said motor swash plate for controlling the displacement of said stationary motor, a first servo-valve having an externally operable first control means mounted on said housing, first fluid passages operatively connecting said first auxiliary motor with said first servo-valve, a second servo-valve having an externally operable second control means mounted on said housing, second fluid passages operatively connecting said second auxiliary motor with said second servo-valve, a source of fluid pressure operatively connected to said servo-valves to energize controllably said auxiliary motors for selectively controlling independently the angle of inclination of each of said swash plates, a valve plate constrained for rotation with said output shaft and positioned between said pump and stationary motor, fluid openings disposed in said valve plate positioned cooperatively for communicating fluid flow between the cylinders of said pump with the cylinders of said stationary motor, fluid power take-off passages disposed in said valve plate and said housing communicating with said fluid openings operatively and connectable with an external fluid power receiver, whereby said transmission is capable of providing fluid power take-off, and by appropriate operation of each of said control means the driven speed of said output shaft in respect to said input shaft speed may be infinitely varied between forward overdrive speed and reverse overdrive speed, neutral and braking of said output shaft.

8. A transmission according to claim 7 wherein each of the servo-valves is provided with mechanical means for sensing the angular inclination of its associated swash plate whereby each servo-valve is actuated in a direction to correct automatically any change in angular inclination of said swash plate inconsistent with the selected position of its control means.

9. A transmission according to claim 7 wherein an externally operable bypass valve is provided for interconnecting the fluid openings of the valve plate.

10. A hydromechanical power transmission with fluid power take-off comprising a housing, an input shaft and an output shaft journalled for coaxial rotation, a multi-cylinder variable displacement hydraulic pump constrained for rotation with said input shaft and a multi-cylinder variable displacement hydraulic stationary motor mounted on said housing, a pump swash plate and a motor swash plate mounted on said output shaft and constrained for rotation therewith, said pump swash plate being positioned for actuating said pump and said motor swash plate being positioned in driven relation with said motor, an auxiliary hydraulic motor constrained for rotation with said output shaft and positioned to adjust selectively the angle of inclination of one of said swash plates and externally operable second means disposed in said housing positioned to adjust selectively the angle of inclination of the other of said swash plates for controlling independently the displacements of said pump and stationary motor, a servo-valve having an externally operable first control means mounted on said housing, fluid passages operatively connecting said auxiliary motor with said servo-valve, a source of fluid pressure operatively connected to said servo-valve to energize controllably said auxiliary motor, a valve plate constrained for rotation with said output shaft and positioned between said pump and stationary motor, fluid openings disposed in said valve plate positioned cooperatively for communicating fluid flow between the cylinders of said pump with the cylinders of said stationary motor, fluid power take-off passages disposed in said valve plate and said housing communicating with said fluid openings and connectable with an external fluid power receiver, whereby said transmission is provided with fluid power take-off, and by appropriate operation of each of said control means the driven speed of said output shaft in respect to said input shaft speed may be infiinitely varied between forward overdrive speed and reverse overdrive speed, neutral and braking of said output shaft.

11. A transmission according to claim 10 wherein the servo-valve is provided with means for sensing the angular inclination of its associated swash plate whereby the servo-valve is actuated in a direction to correct automatically any change in angular inclination of said swash plate inconsistent with the position of its control means.

12. A transmission according to claim 10 wherein an externally operable by-pass valve is interposed in the fluid power take-off passages for interconnecting the fluid openings of the valve plate.

13. A hydromechanical power transmission with fluid power take-off comprising a housing, an input shaft and an output shaft journalled for coaxial rotation, a multi-cylinder variable displacement hydraulic pump constrained for rotation with said input shaft and a multi-cylinder variable displacement hydraulic stationary motor mounted on said housing, a pump swash plate and a motor swash plate mounted on said output shaft and constrained for rotation therewith, said pump and said motor swash plate being positioned in driven relation with said motor, externally operable control means in said transmission for selectively adjusting the inclination of each of said swash plates independently for controlling the displacement of said pump and stationary motor, a valve plate constrained for rotation with said output shaft and positioned between said pump and stationary motor, fluid openings disposed in said valve plate positioned cooperatively for communicating fluid flow between the cylinders of said pump with the cylinders of said stationary motor, fluid power take-off passages disposed in said valve plate and said housing communicating with said fluid openings and connectable with an external fluid power receiver, whereby said transmission is provided with fluid power take-off, and by appropriate operation of said control means the driven speed of said output shaft in respect to said input shaft speed may be infinitely varied between forward overdrive speed and reverse overdrive speed, neutral and braking of said output shaft.

14. A transmission according to claim 13 wherein an externally operable by-pass valve is interposed in the fluid power take-off passages for directing power take-off fluid flow unidirectionally irrespective of direction of rotation of the input and output shafts.

15. A transmission according to claim 13 wherein a fluid flow check valve system is interposed in the fluid power take-off fluid flow unidirectionally irrespective of direction of rotation of the input and output shafts.

16. A hydromechanical power transmission comprising a housing, an input shaft and an output shaft journalled for coaxial rotation, a multi-cylinder variable displacement hydraulic pump constrained for rotation with said input shaft and a multi-cylinder variable displacement hydraulic stationary motor mounted on said housing, a pump swash plate and a motor swash plate mounted on said output shaft and constrained for rotation therewith, said pump swash plate being positioned for actuating said pump and said motor swash plate being positioned in driven relation with said motor, externally operable control means for selectively adjusting the inclination of each of said swash plates independently for controlling the displacement of said pump and stationary motor, a valve plate constrained for rotation with said output shaft and positioned between said pump and said motor, and fluid openings disposed in said valve plate positioned cooperatively for communicating fluid flow between the cylinders of said pump and the cylinders of said motor wherein by appropriate operation of said control means the driven speed of said output shaft with respect to said input shaft speed may be infinitely varied between forward overdrive speed and reverse overdrive speed, neutral and braking of said output shaft.

17. A transmission according to claim 16 wherein external valve means is provided for interconnecting the fluid openings of the valve plate in selectively controllable by-pass relation whereby said output shaft may be braked controllably independent of reaction on said input shaft.

18. An infinitely variable speed ratio hydro-mechanical power transmission according to claim 16 wherein said externally operable control means for selectively adjusting the inclination of each of said swash plates includes first and second auxiliary hydraulic linear motors constrained for rotation with said output shaft, each of said linear motors being operatively positioned to vary the inclination of each of said swash plates independently of each other, and externally operable control valve means for energizing each of said linear motors for selectively adjusting the inclination of each of said swash plates independently of each other.

19. An infinitely variable speed ratio hydromechanical power transmission according to claim 18 wherein said control means includes at least one servo-valve with swash plate follow-up sensing elements to control each of said linear motors for independently maintaining each of said swash plates at a selected angle of inclination.

20. In an infinitely variable speed ratio hydromechanical power transmissing having a housing, a multi-cylinder hydraulic pump operatively connected to an input shaft, a multi-cylinder hydraulic motor operatively connected to an output shaft, and a valve plate having fluid openings operatively interconnecting hydraulically said pump with said motor; a fluid power take-off means for energizing an auxiliary fluid operated device comprising, external ports disposed in said housing communicatively connected to said auxiliary device and said fluid openings in said valve plate whereby said auxiliary device is hydraulically energized by said hydromechanical power transmission.

References Cited in the file of this patent
UNITED STATES PATENTS

| | | |
|---|---|---|
| 2,257,724 | Bennetch | Oct. 7, 1941 |
| 2,382,027 | Rose | Aug. 14, 1945 |
| 2,706,384 | Schott | Apr. 19, 1955 |
| 2,862,456 | Bauer | Dec. 2, 1958 |

FOREIGN PATENTS

| | | |
|---|---|---|
| 433,450 | Germany | Aug. 31, 1926 |